United States Patent [19]

Thirion de Briel et al.

[11] Patent Number: 5,167,312

[45] Date of Patent: Dec. 1, 1992

[54] FRICTION DISC, IN PARTICULAR FOR A CLUTCH

[75] Inventors: Jacques Thirion de Briel, Levallois-Perret; André Dalbiez, Argenteuil, both of France

[73] Assignee: Valeo, Paris, France

[21] Appl. No.: 762,386

[22] Filed: Sep. 19, 1991

[30] Foreign Application Priority Data

Sep. 19, 1990 [FR] France ................. 90 11542

[51] Int. Cl.$^5$ .................... F16D 13/64; F16D 69/04
[52] U.S. Cl. .................... 192/107 R; 192/70.14; 188/218 XL
[58] Field of Search ............ 192/107 R, 107 C, 70.14, 192/52; 188/73.2, 218 XL

[56] References Cited

U.S. PATENT DOCUMENTS

| | | | |
|---|---|---|---|
| 2,256,709 | 9/1941 | Geyer | 192/107 C |
| 2,337,097 | 12/1943 | Geyer | 192/107 C |
| 2,902,130 | 9/1959 | Halberg | 192/107 R |
| 2,908,368 | 10/1959 | Granke et al. | 192/107 R |
| 3,164,236 | 1/1965 | Baynes et al. | 192/107 C |
| 3,584,719 | 6/1971 | Upchurch | 192/70.14 |
| 3,807,534 | 4/1974 | Eldred | 188/73.2 |
| 4,611,692 | 9/1986 | Everett | 188/73.1 |
| 4,858,742 | 8/1989 | Cameron | 192/107 C |

FOREIGN PATENT DOCUMENTS

| | | |
|---|---|---|
| 2354152 | 5/1974 | Fed. Rep. of Germany . |
| 866176 | 6/1941 | France . |
| 2167191 | 8/1973 | France . |

*Primary Examiner*—Richard Lorence
*Attorney, Agent, or Firm*—Longacre & White

[57] ABSTRACT

A friction disc comprises a circular clutch plate with a plurality of friction liners distributed around the clutch plate coaxially with the latter. Each friction liner is retained on the clutch plate, and comprises two pads. One of these pads is on one side of the clutch disc, and the other pad is on the other side. At least one of the pads of each friction liner has a rolling surface for engagement with the corresponding side of the clutch disc, such that the pad concerned is able to tilt with respect to the clutch plate.

12 Claims, 3 Drawing Sheets

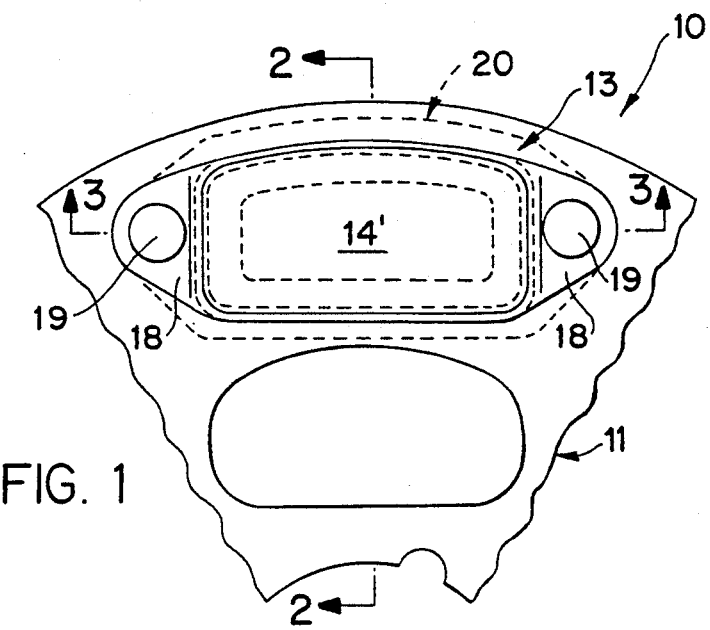
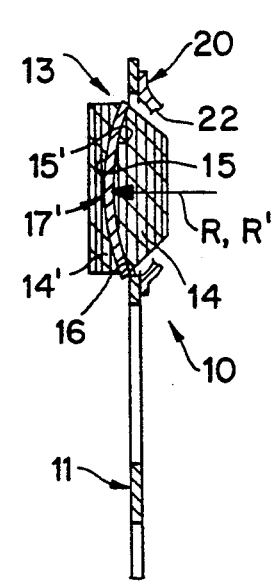
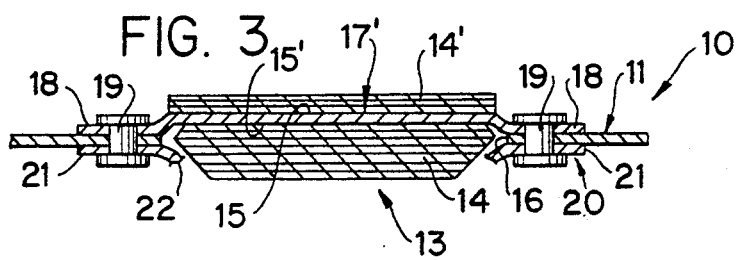
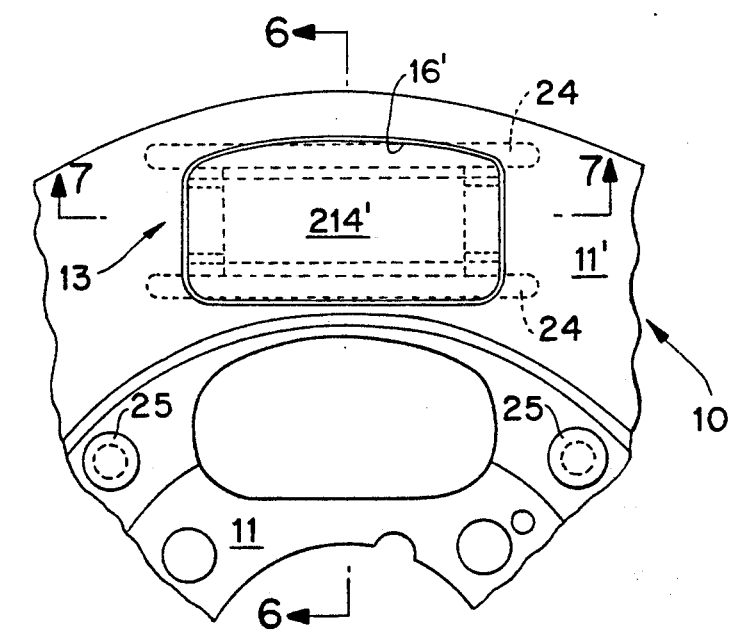
FIG. 1
FIG. 2
FIG. 3
FIG. 4
FIG. 5

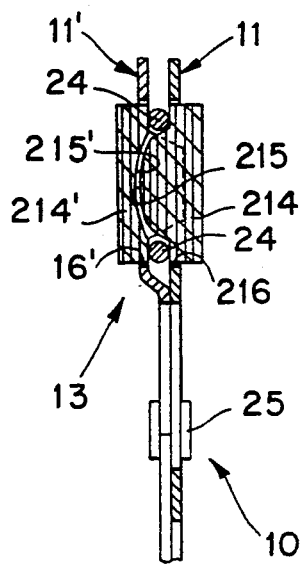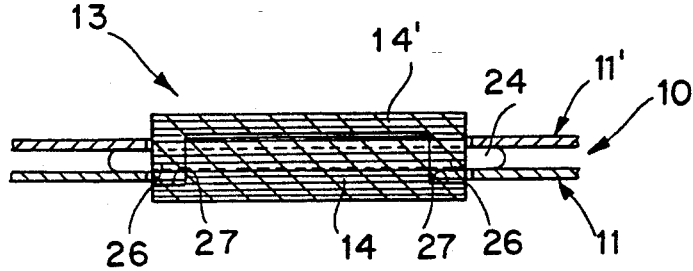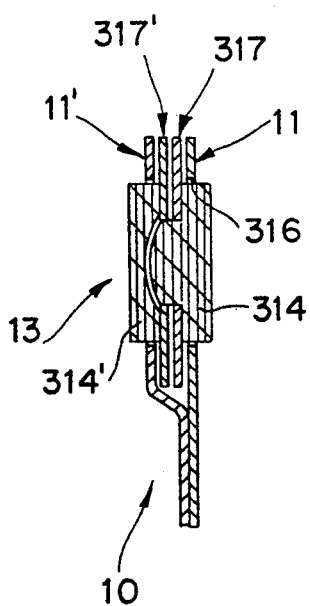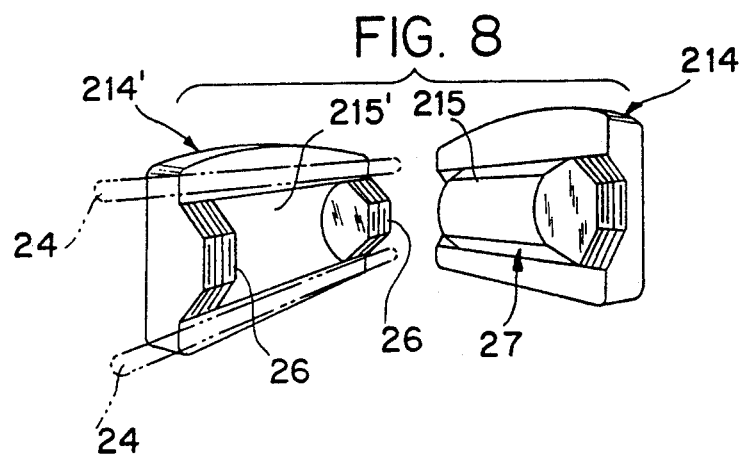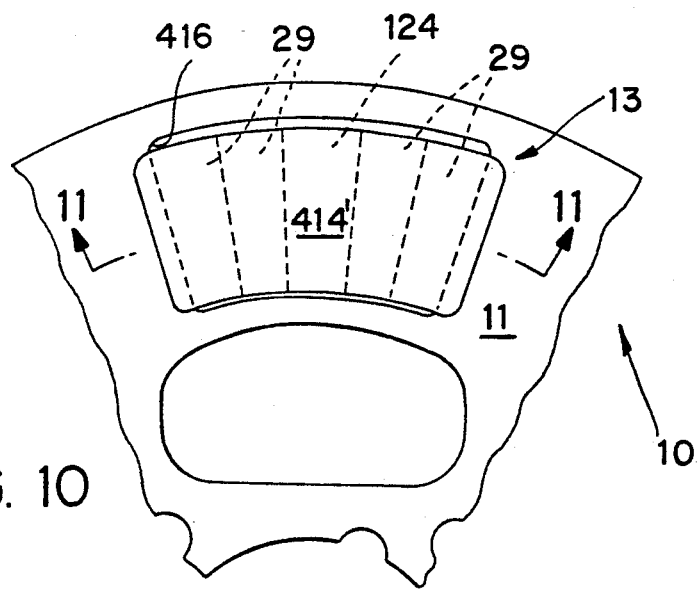

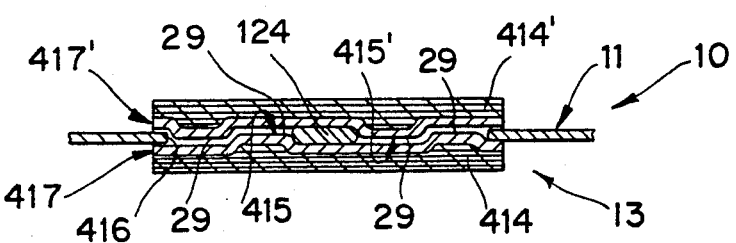
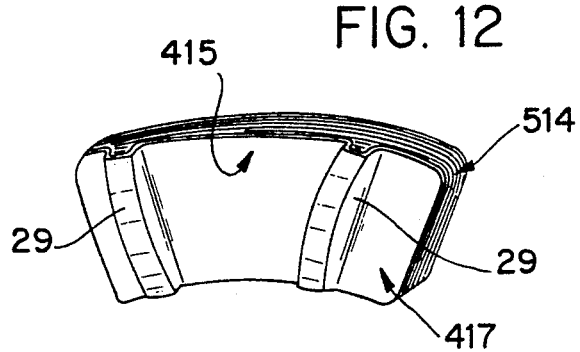
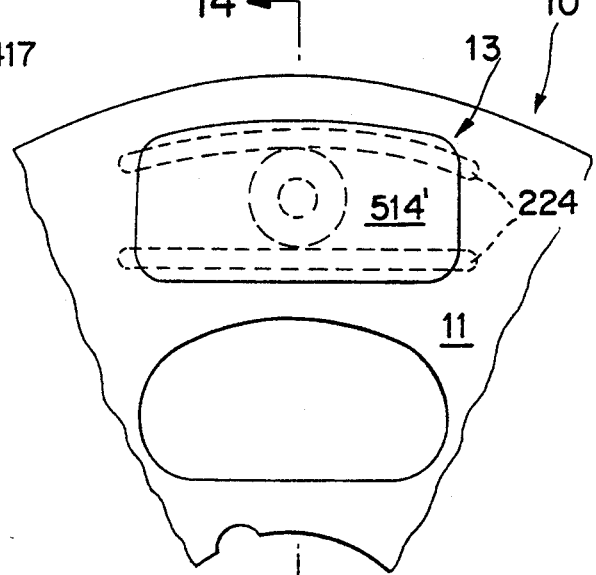
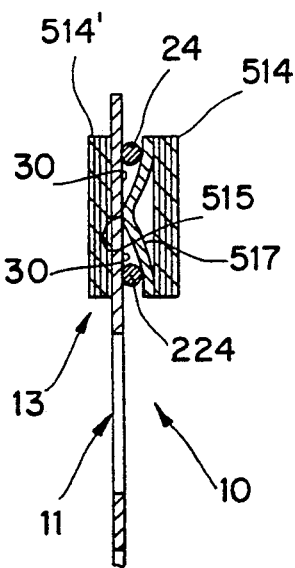
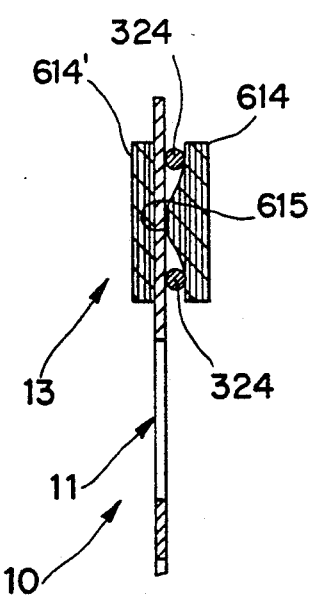

FRICTION DISC, IN PARTICULAR FOR A CLUTCH

FIELD OF THE INVENTION

The present invention relates to friction discs, especially (though not exclusively) for motor vehicle clutches, and being of the kind comprising a clutch plate with a plurality of friction liners distributed on the clutch plate coaxially with the latter, each friction liner being retained on the clutch plate and comprising two pads arranged with one pad on one side of the clutch plate and the other pad on its other side.

BACKGROUND OF THE INVENTION

Each time the clutch is engaged, the friction liners become progressively gripped between a pressure plate and a reaction plate of the clutch. As is shown in the specification of U.S. Pat. No. 2,902,130, the heating which is caused by the corresponding friction effects leads inevitably to the pressure plate eventually adopting a conical shape. The same is true of the reaction plate, albeit to a lesser extent. The result is that the zone in which the friction liners are subjected to pressure from one or other of the pressure and reaction plates are displaced progressively towards the axis of the assembly. A consequence of this is uneven wear of the friction liners, with a reduction in their effectiveness and possibly even damage to the liners.

DISCUSSION OF THE INVENTION

An object of the present invention is to provide a friction disc in which the pads of a friction liner are able to follow any possible deformation of the pressure and-/or reaction plate into a conical shape.

According to the invention, a friction disc comprising a clutch plate, together with a plurality of friction discs distributed on the clutch plate coaxially with the latter, with each friction liner being retained on the clutch plate, one of which is on one side of the clutch plate and the other of which is on the other side of the clutch plate, is characterised in that at least one of the pads of each friction liner has a first rolling surface for rolling on the corresponding side of the clutch plate.

In this specification, the term "rolling surface" is to be understood to mean a surface which is curved in at least one dimension, and which enables the pad concerned to tilt about the dimension with respect to the clutch plate, provided that its retention on the latter is suitably ensured (which may be achieved in any one of a number of different ways).

By virtue of its ability to tilt, the pad that has such a rolling surface is beneficially able to follow, as required, any deformation of the associated pressure or reaction plate of the clutch into a conical shape. The useful life of the friction disc is thus increased, as is its effectiveness.

Various embodiments of the invention are described in the description of preferred embodiments which follows, and from which the various features and advantages of the invention will become more apparent. The description is given by way of example only, and with reference to the diagrammatic drawings accompanying this specification.

BRIEF DESCRIPTION OF THE DRAWINGS

FIG. 1 is a partial view in elevation, as seen in the direction of the arrow 1 in FIG. 2, and showing one friction disc in accordance with the invention.

FIGS. 2 and 3 are partial views in cross section of the same friction disc, taken respectively on the lines 2—2 and 3—3 in FIG. 1.

FIG. 4 is a partial view in cross section, similar to FIG. 2 but showing a second embodiment.

FIGS. 5, 6 and 7 are views similar to FIGS. 1, 2 and 3 respectively, but showing a third embodiment of a friction disc in accordance with the invention.

FIG. 8 is an exploded perspective view of the two pads constituting a friction liner of the friction disc in the embodiment of FIGS. 5, 6 and 7.

FIG. 9 is a partial view in cross section, similar to FIG. 6 but showing part of a friction disc in a fourth embodiment of the invention.

FIG. 10 is a partial view in elevation, similar to FIG. 1 but showing a fifth embodiment of the invention.

FIG. 11 is a partial view in cross section taken on the line 11—11 in FIG. 10.

FIG. 12 is a perspective view of one of the pads constituting a friction liner of the friction disc shown in FIGS. 10 and 11.

FIGS. 13 and 14 are partial views, similar to FIGS. 1 and 2 respectively but showing a sixth embodiment of the invention.

FIG. 15 is a partial view in cross section similar to FIG. 14 but showing a seventh embodiment of the invention.

DESCRIPTION OF PREFERRED EMBODIMENTS OF THE INVENTION

Generally, and as shown in FIGS. 1 to 3, a friction disc 10 in accordance with the invention comprises a rotary, circular, relatively thin, metal clutch plate 11 carrying friction liners, together with a plurality of friction liners 13. The friction liners 13 are spaced apart around the centre of the clutch plate 11, to which each liner is attached in one of the various ways which will appear in greater detail later herein. Each clutch plate 11 consists of two pads 14 and 14'. The pads 14 are arranged on one side of the clutch plate 11, and the pads 14' on the other. In each friction liner 13, at least one of its pads, in the present example the pad 14, has a rolling surface 15 in engagement with the side of the clutch plate 11 and such as to enable the pad to execute a tilting movement, if required, with respect to the clutch plate.

As shown in FIGS. 1 to 3, the rolling surface 15 is generally curved about a direction which is tangential with respect to a circumference of the clutch plate 11. In this particular example the rolling surface 15 is cylindrical, having a radius R. In the present example it is only the pad 14, and not the pad 14', that has a rolling surface 15, the pad 14' being rigidly attached to the clutch plate 11. The rolling surface 15 of the pad 14 lies against a further rolling surface 15' formed on the clutch plate 11.

In the example seen in FIGS. 1 to 3, the pads 14 and 14' are arranged in line with a window 16 formed in the clutch plate 11, and the rolling surface 15' of the latter is formed in a curved plate 17' which is carried laterally by lugs 18 on the clutch plate 11. The plate 17' is for example attached to the clutch plate 11 by means of rivets 19, and carries the pad 14 in its central part. The radius of curvature of the rolling surface 15' is R', and in FIGS. 1 to 3, the radii of curvature R and R' are equal to each other.

In the second embodiment shown in FIG. 4, which is a modification of that shown in FIGS. 1 to 3, the radius R' is greater than the radius R, thus reducing the corresponding friction effects. The curved plate, here indicated by the reference numeral 117', the fixed pad (here indicated by the reference numeral 114') and the rolling surface of the clutch plate 11 (here indicated by the reference numeral 115') are modified accordingly.

Regardless of the arrangement adopted, guide means are provided around the pad 14 that has the rolling surface, for retaining it in position. In this example these guide means comprise a retaining plate 20, which is carried laterally by lugs 21 on the clutch plate 11 and which is secured to the latter by means of the same rivets 19 as the curved plate 17', though on the other side of the clutch plate from the latter. The retaining plate 20 is formed with an aperture 22. At least part of the periphery of the aperture 22 (but in the present example the whole of its periphery) is bounded by an oblique guide lip, and the pad 14 itself has oblique edges extending along the whole length of its periphery and through the window 16.

With the above arrangement, the pad 14, projecting from the window 16, is able to tilt about a direction which is tangential with respect to the clutch plate 11, without however being able to escape from the latter. At the same time it can be seen that the pad 14 is mounted so as to float with respect to the clutch plate. Because of its ability to tilt, the pad 14 is in any case able to conform to any possible conical deformation of the associated plates, and to adopt their shape. In practice, the pads 14 having the rolling surface 15, in all the friction liners 13, are all on the same side of the clutch plate 11. When applied to a clutch, this side of the clutch plate is preferably selected to be the side which engages with the pressure plate of the clutch. The pads 14' are then so disposed that they are engaged by the reaction plate of the clutch.

In the present example, the curved plate 17' of each friction liner 13 acts as a support plate for the fixed pad 14' of the friction liner. Without such a support plate, the pad 14 is simply a block of friction material. The pad 14' is for example attached to the support plate 17' by means of an adhesive or by brazing, so as to be firmly secured to it.

Referring now to FIGS. 5 to 8, in this third embodiment the support plate is in fact absent. In each friction liner 13 in this embodiment, the two pads are indicated by the reference numerals 214 and 214'. One of these, and in the example shown the pad 214, has a rolling surface 215, and is engaged in a window 216 formed in the clutch plate 11. The pads 214 and 214' are spaced away from each other by means of at least one retaining bar 24 of a resilient material, for example an elastomer, which extends beyond the window 216 (in this example circumferentially), and which is held between the clutch plate 11 and a backing plate 11'. The backing plate 11' is secured to the clutch plate 11, for example by means of rivets 25.

The other pad (i.e. in this example the pad 214') is engaged in a further window 16' which is formed in the backing plate 11'. In this example, there are two retaining bars 24, arranged parallel to each other and perpendicular to the radius of the assembly which bisects the pads 214, 214'. The retaining bars 24 are secured adhesively to both of the pads 214 and 214', and are therefore fixed to these latter. Thus the retaining bars constitute retaining means for retaining the pads in position with respect to the clutch plate 11 and backing plate 11'.

In this example the two pads 214 and 214' have respective conjugate rolling surfaces 215 and 215'. These rolling surfaces are arranged facing each other and are convex and concave respectively, as can be seen in FIGS. 6 and 8. As in the previous example, their radii of curvature can be equal to each other as shown, though they may be different from each other.

In FIG. 6, a clearance is shown between the rolling surfaces 215 and 215', for convenience in drawing. In fact, they may equally well be in engagement with each other, while being able to move wholly or partly apart in any way in service when the pads 214 and 214' are gripped between the pressure plate and the reaction plate of the clutch.

In addition, in the present example the pads 214 and 214' are abutted against each other at their lateral ends. For example, and as can be seen best in FIG. 8, the pad 214' having the hollow rolling surface 215' has at its ends portions 26 between which it encloses a projection 27 formed on the pad 214. The rolling surface 215 of the pad 214 is formed on this projection 27. In this example the portions 26 are trapezoidal in form, and their ends are free.

Reference is now made to FIG. 9. In this example, the pads of each friction liner 13 are indicated by the reference numerals 314 and 314'. Each of these pads includes a support plate 317, 317' respectively, extending beyond the window, 316, formed in the clutch plate 11, for example radially and/or circumferentially. Each support plate, like the retaining bars in the previous embodiment, is held between the clutch plate 11 and the backing plate 11'.

Referring now to FIGS. 10 to 12, in these Figures the two pads of each friction liner 13 are indicated by the reference numerals 414 and 414', and are arranged in line with a window 416 formed in the clutch plate 11. They extend (for example) circumferentially as shown, beyond the window 416, and are spaced away from each other by means of at least one retaining bar 124 of resilient material, which is mounted in the window 416.

In the present example there is only one retaining bar 124, and it extends substantially radially between the respective central portions of the pads 414 and 414'. As in the previous example, the retaining bar is for example of elastomeric material and adhered to both of the pads 414 and 414'. The retaining bar thus constitutes a means for retaining the pads with respect to the clutch plate 11. At least one of the pads 414, 414' has at least one radial rib 29 on its back, with a rolling surface 415, 415' respectively being formed on the back of the corresponding rib 29. In this example this arrangement applies to both of the pads 414, 414', with each of these pads having two of the ribs 29.

The ribs 29 are overlapped as between the pads 414 and 414', with the retaining bar 124 disposed between them. For example (and as shown) the pads 414 and 414' include support plates 417 and 417' respectively, the ribs 29 being defined on these support plates.

Referring now to FIGS. 13 and 14, in which the pads of each friction liner 13 are indicated by the reference numerals 514 and 514', the pad 514 has a rolling surface 515 which is engaged on a flat engagement surface of the clutch plate 11. The pad 514 is retained by being attached to the clutch plate 11 by means of at least one retaining bar 224 of resilient material. In this example, the engagement surface 30 formed directly on the clutch plate 11.

In the example shown in FIGS. 13 and 14, the pad 514 includes a support plate 517, on which its rolling surface 515 is formed. The support plate 517 is therefore suitably curved.

FIG. 15 shows a modification in which the rolling surface, 615, is directly formed on the body of friction material which constitutes the pad 614 corresponding to the pad 514 in FIG. 14. However, in both cases two retaining bars (224 in FIGS. 13 and 14, 324 in FIG. 15), are provided, parallel to each other and arranged at right angles to the radius of the assembly which bisects the pads 514, 514' or 614, 614'. The pad 514' or 614' is fixed, being directly secured to the clutch plate 11 on the other side of the latter, for example by adhesive fastening or brazing.

By contrast with the preceding examples, the retaining bars 324 act in operation to transfer to the clutch plate 11 the friction torque which arises by virtue of contact with the rolling pad 614. They will of course be designed accordingly. However, if desired, the pad 614 may be restrained laterally by means of tabs projecting from the clutch plate 11.

The invention is of course not limited to the embodiments described above and shown in the drawings, but embraces any other practical variant and/or combination of the various elements of the embodiments described. It should also be noted that if those pads that are capable of tilting become restrained circumferentially against the clutch plate that carries them, by virtue of the entraining force to which they are subjected during gripping, this restraining effect occurs only at the end of gripping, so that the desired rolling action, to enable the pad to adapt itself to any possible conical deformation of the pressure and/or reaction plate concerned, will already have been able to take place.

As will be clear from the above description and from the drawings, the ability of the pad concerned to tilt leads to even wear of each friction liner, especially in contact with the pressure plate, which (as is known in the case of a motor vehicle clutch) is fixed with respect to the crankshaft of the vehicle for rotation with the latter. The reaction plate is fixed in the same way, while the friction disc is carried on the input shaft of the gearbox for rotation therewith. In current practice, the pressure plate is coupled with a cover plate, for rotation with the cover plate, but is axially movable with respect to the latter. Axially acting resilient means, for example a diaphragm or a set of coil springs, bear against the cover plate so as to urge the pressure plate towards the reaction plate so that the friction liners of the friction disc are gripped between the pressure and reaction plates. This arrangement is for example shown in FIG. 1 of U.S. Pat. No. 2 902 130.

With the use of the present invention, there is no offset of the contact zone of the liners with the pressure and reaction plates towards the centre, and this leads to improved torque transmission. It will also be appreciated that the liners have good resistance to centrifugal force, by virtue, in particular, of the guide means and retaining bars provided in the embodiments described above.

What is claimed is:

1. A friction disc comprising a clutch plate and a plurality of friction liners spaced around the clutch plate coaxially therewith, and retaining means for retaining each friction liner on the clutch plate, each friction liner comprising a first pad disposed on one side of the clutch plate and a second pad disposed on the other side of the clutch plate, with at least one pad of each friction liner having a first rolling surface adapted to tilt said at least one pad for rolling engagement with respect to the clutch plate.

2. A friction disc according to claim 1, wherein the clutch plate defines a second rolling surface against which the said first rolling surface of the appropriate pad of each friction liner is engaged.

3. A friction disc according to claim 1, wherein the clutch plate is formed with a window corresponding to each friction liner, with one of the pads of each friction liner being engaged in the corresponding said window, the friction disc further comprising a backing plate, means securing the backing plate to the clutch plate, and at least one retaining bar of resilient material associated with each friction liner and extending beyond the corresponding said window, the said retaining bars being held between the clutch plate and the backing plate whereby to space the two pads of the friction liner away from each other.

4. A friction disc according to claim 1, wherein the clutch plate is formed with a window corresponding to each friction liner, with one of the pads of each friction liner being engaged in the corresponding said window, the friction disc further comprising a backing plate and means securing the backing plate to the clutch plate, with each said support plate being retained between the clutch plate and the backing plate.

5. A friction disc according to claim 1, wherein both said pads of each friction liner are provided with rolling surfaces, the rolling surfaces of the two associated pads being arranged facing each other.

6. A friction disc according to claim 5, wherein the rolling surfaces of the two pads of each friction liner comprise respectively a concave surface and a complementary convex surface, with the two pads having lateral end portions abutted to each other.

7. A friction disc according to claim 1, wherein the clutch plate is formed with a window corresponding to each friction liner, the two said pads of each friction liner being arranged in line with the corresponding said window and extending beyond it, the friction disc further comprising at least one bar of resilient material located in each said window whereby to space the two associated pads apart from each other.

8. A friction disc according to claim 7, wherein at least one of the pads of each friction liner has a back, and a rib formed on its said back, with a said first rolling surface of the pad being formed on the back of the rib or ribs of the pad.

9. A friction disc according to claim 1, wherein the clutch plate defines an engagement surface, with each said first rolling surface being in engagement with the said engagement surface, the friction disc further comprising at least one bar of resilient material whereby the said pad is attached to the clutch plate.

10. A friction disc according to claim 1, wherein each said first rolling surface is generally curved about a direction which is tangential with respect to a circumference of the clutch plate.

11. A friction disc according to claim 1, wherein only one of the pads of each friction liner has a said first rolling surface, while the other is rigidly attached to the clutch plate, the friction disc further comprising retaining means for retaining the pad having a said first rolling surface on the clutch plate.

12. A friction disc comprising a clutch plate and a plurality of friction liners spaced around the clutch plate coaxially therewith, and retaining means for retaining each friction liner on the clutch plate, each friction liner comprising a first pad disposed on one side of the clutch plate and a second pad disposed on the other side of the clutch plate, with at least one pad of each friction liner having a first rolling surface for rolling engagement in a radial direction with respect to the clutch plate whereby said at least one pad is adapted to tilt in said radial direction with respect to the clutch plate.

* * * * *